US011182443B2

(12) United States Patent
Sengaru

(10) Patent No.: US 11,182,443 B2
(45) Date of Patent: Nov. 23, 2021

(54) CONTEXT-SENSITIVE DOCUMENT SEARCH BASED ON HIERARCHICAL TAGS

(71) Applicant: SAP SE, Walldorf (DE)

(72) Inventor: Praveer Sengaru, Palo Alto, CA (US)

(73) Assignee: SAP SE, Walldorf (DE)

( * ) Notice: Subject to any disclaimer, the term of this patent is extended or adjusted under 35 U.S.C. 154(b) by 739 days.

(21) Appl. No.: 15/616,892

(22) Filed: Jun. 7, 2017

(65) Prior Publication Data
US 2018/0357319 A1    Dec. 13, 2018

(51) Int. Cl.
*G06F 16/00*     (2019.01)
*G06F 16/9535*   (2019.01)
*G06F 7/08*      (2006.01)
*G06F 16/93*     (2019.01)

(52) U.S. Cl.
CPC ............ *G06F 16/9535* (2019.01); *G06F 7/08* (2013.01); *G06F 16/93* (2019.01)

(58) Field of Classification Search
CPC ......... G06F 16/93; G06F 16/9535; G06F 7/08
See application file for complete search history.

(56) References Cited

U.S. PATENT DOCUMENTS

| | | | | |
|---|---|---|---|---|
| 2005/0187915 | A1* | 8/2005 | De Lury | G06F 16/958 |
| 2009/0282010 | A1* | 11/2009 | Vasudevan | G06F 16/367 |
| 2010/0095197 | A1* | 4/2010 | Klevenz | G06F 17/2247 |
| | | | | 715/234 |
| 2011/0264651 | A1* | 10/2011 | Selvaraj | G06F 17/30867 |
| | | | | 707/723 |
| 2015/0134666 | A1* | 5/2015 | Gattiker | G06F 16/3338 |
| | | | | 707/739 |
| 2016/0196270 | A1* | 7/2016 | DiMaria | H04N 21/854 |
| | | | | 707/749 |
| 2016/0217202 | A1* | 7/2016 | Klahre | G06F 16/288 |
| 2016/0300286 | A1* | 10/2016 | Yan | G06F 3/0482 |
| 2017/0103132 | A1* | 4/2017 | Wall | G06F 17/3053 |

* cited by examiner

*Primary Examiner* — Dinku W Gebresenbet
(74) *Attorney, Agent, or Firm* — Fountainhead Law Group P.C.

(57) ABSTRACT

Some embodiments provide a non-transitory machine-readable medium that stores a program. The program receives a set of metadata associated with a web page provided by an application. The set of metadata includes a first attribute value in a first hierarchy of attributes and a second attribute value in a second hierarchy of attributes. The method further determines a set of boost values based on the set of metadata, the first hierarchy, and the second hierarchy. The method also generates a query for documents associated with the web page based on the set of boost values. The method further executes the query in order to generate a result set of document associated with the web page.

20 Claims, 7 Drawing Sheets

| Document | Tags |
|---|---|
| 405 Document 1 | USA |
| 410 Document 2 | Desk |
| 415 Document 3 | Chair |
| 420 Document 4 | Europe |
| 425 Document 5 | Office Furniture |
| 430 Document 6 | Chair, USA |
| 435 Document 7 | Non-ergonomic Chair |
| 440 Document 8 | California |
| 445 Document 9 | Computer Chair |
| 450 Document 10 | Hardware |

| Documents | Relevance Score |
|---|---|
| 430 Document 6 | 5 |
| 415 Document 3 | 3.3333333 |
| 425 Document 5 | 2.666666 |
| 445 Document 9 | 2 |
| 435 Document 7 | 2 |
| 405 Document 1 | 1.6666667 |
| 450 Document 10 | 1.3333333 |
| 440 Document 8 | 1 |

FIG. 5

CONTEXT-SENSITIVE DOCUMENT SEARCH BASED ON HIERARCHICAL TAGS

BACKGROUND

Many software applications include a help component that is configured to provide a user with assistance in using the software application. In some instances, a software application allows a user to access a help document that includes a table of contents listing the different sections of topics. A software application may also provide a search feature that allows a user to search through a help source (e.g., a knowledge base) and then returns results based on search terms entered by the user. Such a feature can be beneficial to users who are well-versed with the software application and know how to navigate through the documentation or knowledge base.

SUMMARY

In some embodiments, a non-transitory machine-readable medium stores a program. The program receives a set of metadata associated with a web page provided by an application. The set of metadata includes a first attribute value in a first hierarchy of attributes and a second attribute value in a second hierarchy of attributes. The method further determines a set of boost values based on the set of metadata, the first hierarchy, and the second hierarchy. The method also generates a query for documents associated with the web page based on the set of boost values. The method further executes the query in order to generate a result set of document associated with the web page.

In some embodiments, the program may further identify a first set of attribute values based on the first hierarchy. The program may also identify a second set of attribute values based on the second hierarchy. Determining the set of boost values may include determining a boost value for the first attribute value, determining a boost value for the second attribute value, determining a boost value for each attribute value in the first set of attribute values, and determining a boost value for each attribute value in the second set of attribute values. Determining the boost values for the first attribute value and the first set of attribute values may be based on a first weight value. Determining the boost values for the second attribute value and the second set of attribute values may be based on a second weight value. Determining the set of boost values may include assigning a first set of priority values to attribute values in the first hierarchy of attribute values and assigning a second set of priority values to attribute values in the second hierarchy of attribute values. Determining the boost values for the first attribute value and the first set of attribute values may be based on the first set of priority values. Determining the boost values for the second attribute value and the second set of attribute values may be based on the second set of priority values.

In some embodiments, executing the query may include retrieving a set of documents from a plurality of documents, calculating a relevance score for each document in the set of documents sorting the set of documents based on the relevance scores, and determining a defined number of documents in the set of documents having the highest relevance scores as the result set of documents associated with the web page. The program may further provide the result set of documents concurrently with the web page provided by the application.

In some embodiments, a method receives a set of metadata associated with a web page provided by an application. The set of metadata includes a first attribute value in a first hierarchy of attributes and a second attribute value in a second hierarchy of attributes. The method further determines a set of boost values based on the set of metadata, the first hierarchy, and the second hierarchy. The method also generates a query for documents associated with the web page based on the set of boost values. The method further executes the query in order to generate a result set of document associated with the web page.

In some embodiments, the method may further identify a first set of attribute values based on the first hierarchy. The method may also identify a second set of attribute values based on the second hierarchy. Determining the set of boost values may include determining a boost value for the first attribute value, determining a boost value for the second attribute value, determining a boost value for each attribute value in the first set of attribute values, and determining a boost value for each attribute value in the second set of attribute values. Determining the boost values for the first attribute value and the first set of attribute values may be based on a first weight value. Determining the boost values for the second attribute value and the second set of attribute values may be based on a second weight value. Determining the set of boost values may include assigning a first set of priority values to attribute values in the first hierarchy of attribute values and assigning a second set of priority values to attribute values in the second hierarchy of attribute values. Determining the boost values for the first attribute value and the first set of attribute values may be based on the first set of priority values. Determining the boost values for the second attribute value and the second set of attribute values may be based on the second set of priority values.

In some embodiments, executing the query may include retrieving a set of documents from a plurality of documents, calculating a relevance score for each document in the set of documents, sorting the set of documents based on the relevance scores, and determining a defined number of documents in the set of documents having the highest relevance scores as the result set of documents associated with the web page. The program may further provide the result set of documents concurrently with the web page provided by the application.

In some embodiments, a system includes a set of processing units and a non-transitory computer-readable medium that stores instructions. The instructions cause at least one processing unit to receive a set of metadata associated with a web page provided by an application. The set of metadata includes a first attribute value in a first hierarchy of attributes and a second attribute value in a second hierarchy of attributes. The instructions further cause the at least one processing unit to determine a set of boost values based on the set of metadata, the first hierarchy, and the second hierarchy. The instructions also cause the at least one processing unit to generate a query for documents associated with the web page based on the set of boost values. The instructions further cause the at least one processing unit to execute the query in order to generate a result set of document associated with the web page.

In some embodiments, the instructions may further cause the at least one processing unit to identify a first set of attribute values based on the first hierarchy. The instructions may also cause the at least one processing unit to identify a second set of attribute values based on the second hierarchy. Determining the set of boost values may include determining a boost value for the first attribute value, determining a boost value for the second attribute value, determining a boost value for each attribute value in the first set of attribute values, and determining a boost value for each attribute value in the second set of attribute values. Determining the boost values for the first attribute value and the first set of attribute values may be based on a first weight value. Determining the boost values for the second attribute value and the second set of attribute values may be based on a second weight value. Determining the set of boost values may include assigning a first set of priority values to attribute values in the first hierarchy of attribute values and assigning a second set of priority values to attribute values in the second hierarchy of attribute values. Determining the boost values for the first attribute value and the first set of attribute values may be based on the first set of priority values. Determining the boost values for the second attribute value and the second set of attribute values may be based on the second set of priority values.

In some embodiments, executing the query may include retrieving a set of documents from a plurality of documents, calculating a relevance score for each document in the set of documents, sorting the set of documents based on the relevance scores, and determining a defined number of documents in the set of documents having the highest relevance scores as the result set of documents associated with the web page.

The following detailed description and accompanying drawings provide a better understanding of the nature and advantages of the present invention.

BRIEF DESCRIPTION OF THE DRAWINGS

FIG. 4 illustrates example tagged documents according to some embodiments.

FIG. 5 illustrates an example result set of documents according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for searching documents tagged with hierarchical tags. In some embodiments, several hierarchies of attribute values may be defined for several attributes. Based on the defined attribute hierarchies, different documents can be tagged with attribute values in the attribute hierarchies. In some embodiments, a system includes one or more applications running on the system. While using an application, a user may request for documents relevant to features and/or aspect of the application that the user is currently using. In response to such a request, the system may search for relevant documents based on context information associated with the application and provide the relevant documents to the user.

Figure 1:
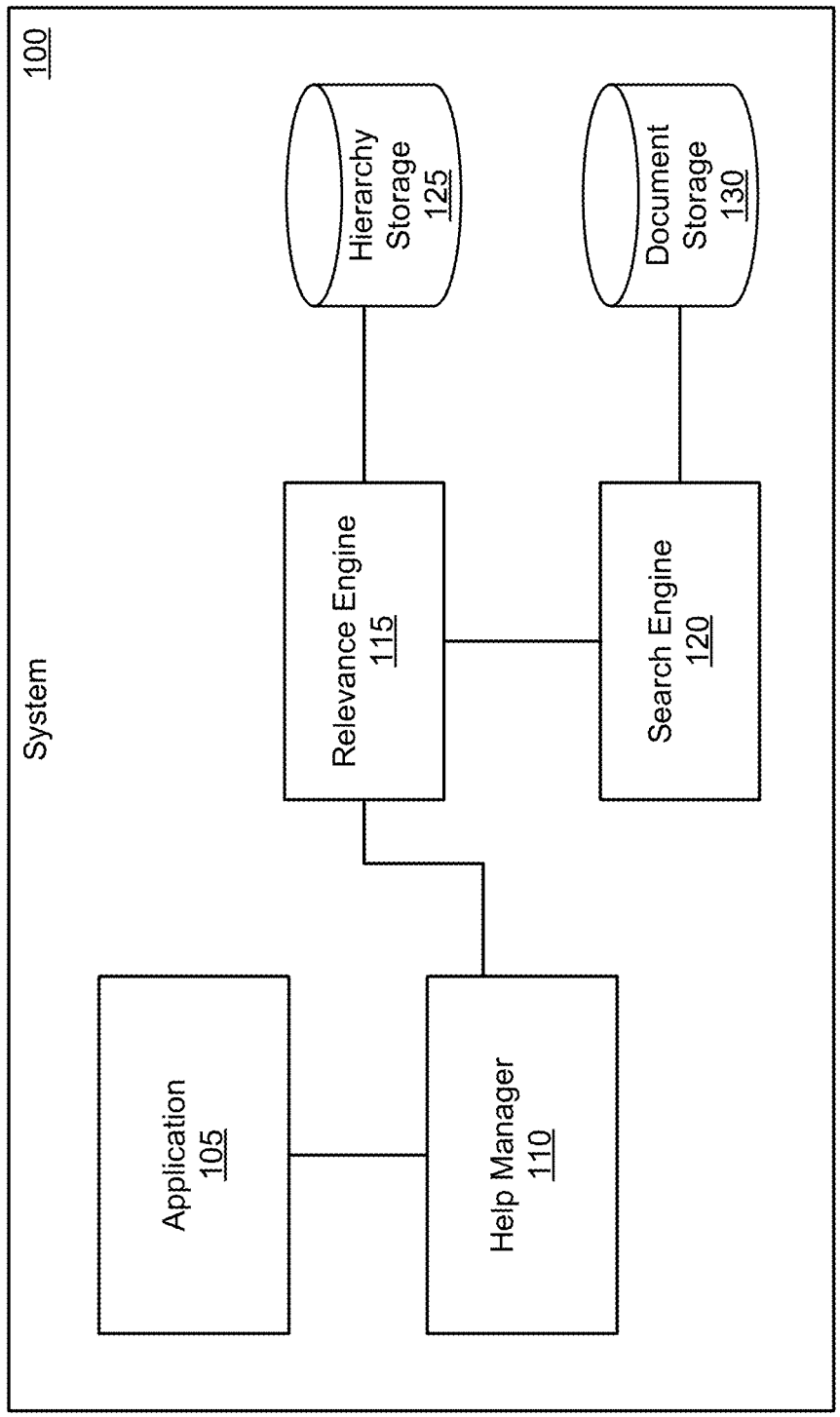
FIG. 1 illustrates a system that includes a context-sensitive document ordering feature according to some embodiments.

FIG. 1 illustrates a system 100 that includes a context-sensitive document ordering feature according to some embodiments. As shown, system 100 includes application 105, help manager 110, relevance engine 115, search engine 120, hierarchy storage 125, and document storage 130. Application 105 is a software application/program that includes instructions for performing a set of tasks when executed by system 100. In some embodiments, application 105 may provide one or more web pages to users of application 105. In addition, application 105 may provide a help feature that provides relevant documents to users of application 105. The web pages and help feature may be provided to users via a graphical user interface (GUI). Through the GUI, application 105 may receive requests to enable or disable the help feature (e.g., by receiving a selection of a GUI option for displaying/hiding the help feature). In response to such a request, application 105 may send help manager 110 a request to provide relevant documents. In some embodiments, application 105 sends help manager 110 the request along with a set of metadata that includes context information associated with the application 105. The context information associated with the application 105 may include one or more attribute values specified in hierarchies of attributes that are associated with a web page application 105 is providing to a user.

Figure 2:
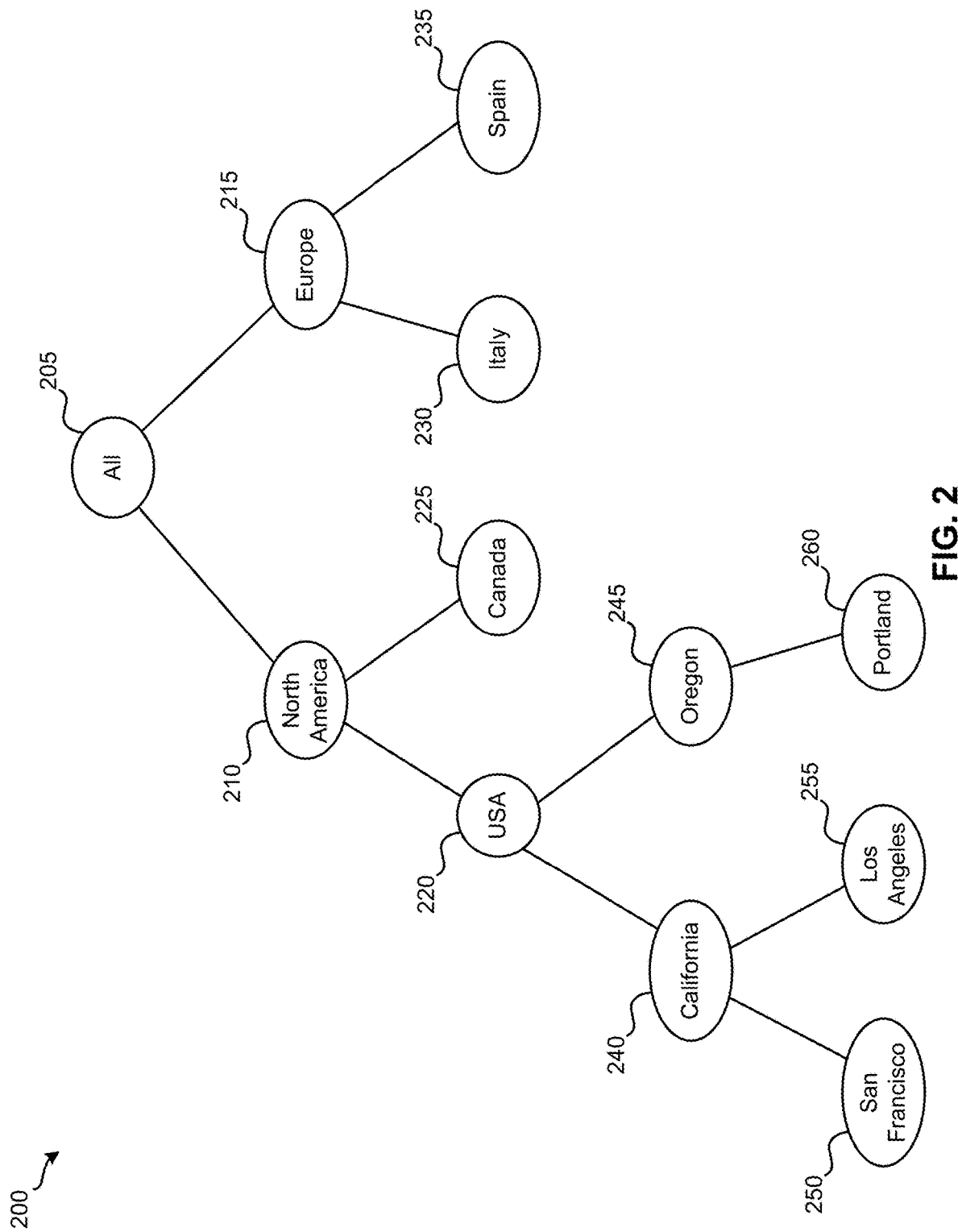
FIG. 2 illustrates an example hierarchy of location according to some embodiments.

Hierarchy storage 125 is configured to store hierarchies of attribute values. FIG. 2 illustrates an example hierarchy of locations 200 according to some embodiments. As shown, hierarchy of locations 200 includes nodes 205-260 that include location attribute values representing different locations. For this example, nodes 205-260 are organized according to geographical areas and/or regions. Each child node represents a sub-area or sub-region of the region represented by the parent node. As shown in FIG. 2, node 205 represents all geographical regions (e.g., earth). Nodes 210 and 215 are children of node 205 and represent North America and Europe regions, respectively. Nodes 220 and 225 are children nodes of node 210 and represent USA and Canada regions, respectively. Nodes 230 and 235 are children nodes of node 215 and represent Italy and Spain regions, respectively. Nodes 240 and 245 are children nodes of 220 and represent California and Oregon regions, respectively. Nodes 250 and 255 are children of node 240 and represent San Francisco and Los Angeles regions, respectively. Node 260 is a child of node 245 and represents a Portland region.

Figure 3:
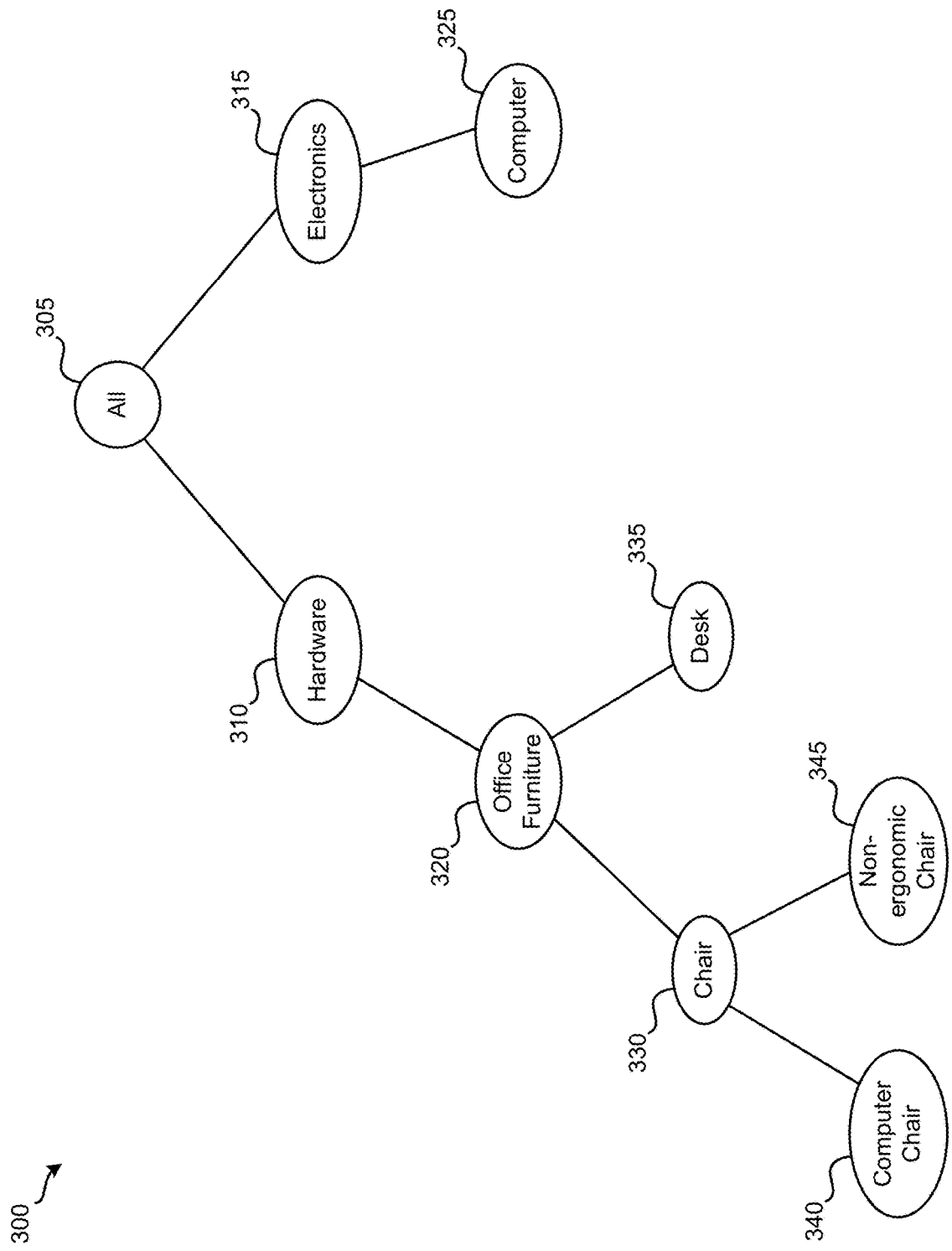
FIG. 3 illustrates an example hierarchy of commodities according to some embodiments.

FIG. 3 illustrates an example hierarchy of commodities 300 according to some embodiments. As illustrated, hierarchy of commodities 300 includes nodes 305-335 that include commodity attribute values representing the different commodities. In this example, the commodities are organized such that each child node represents a sub-category of the category represented by the parent node. As illustrated in FIG. 3, node 305 represents all commodities. Nodes 310 and 315 are children of node 305 and represent hardware and electronics commodities, respectively. Node 320 is a child node of node 310 and represents an office furniture commodity. Node 325 is a child node of node 315 and represents a computer commodity. Nodes 330 and 335 are children nodes of node 320 and represent chair and desk commodities, respectively. Nodes 340 and 345 are children nodes of node 330 and represent computer chair and non-ergonomic chair commodities, respectively.

Returning to FIG. 1, document storage 130 is configured to store documents tagged with one or more attribute values. In some embodiments, such documents are tagged with attribute values specified in hierarchies stored in hierarchy storage 125. FIG. 4 illustrates example tagged documents according to some embodiments. Specifically, FIG. 4 illustrates documents 405-450 that are tagged with attribute values based on hierarchy of locations 200 and/or hierarchy of commodities 300. As shown, document 405 is tagged with a location attribute value of USA, document 410 is tagged with a commodity attribute value of Desk, document 415 is tagged with a commodity attribute value of Chair, document 420 is tagged with a location attribute value of Europe, document 425 is tagged with a commodity attribute value of Office Furniture, document 430 is tagged with a commodity attribute value of Chair and a location attribute value of USA, document 435 is tagged with a commodity attribute value of Non-ergonomic Chair, document 440 is tagged with a location attribute value of California, document 445 is tagged with a commodity attribute value of Computer Chair, and document 450 is tagged with a commodity attribute value of Hardware.

Returning to FIG. 1, storages 125 and 130 may be relational databases, non-relational databases (e.g., document-oriented databases, key-value databases, column-oriented databases, non structured query language (NoSQL) databases, etc.), or a combination thereof. In some embodiments, storages 125 and 130 are implemented in a single physical storage while, in other embodiments, storages 125 and 130 may be implemented across several physical storages. While FIG. 1 shows storages 125 and 130 as part of system 100, one of ordinary skill in the art will appreciated that storages 125 and/or 130 may be external to system 100 in some embodiments.

Help manager 110 is responsible for handling requests from application 105 for relevant documents. For example, help manager 110 may receive such a request along with a set of metadata that includes context information associated with the application 105. As mentioned above, the context information may include one or more attribute values specified in hierarchies of attributes that are associated with a web page application 105 is providing to a user. In response to the request, help manager 110 sends relevance engine 115 the set of metadata and a request for a set of relevant documents. In return, help manager 110 receives the set of relevant documents, which help manager 110 provides to the user (e.g., via a GUI) concurrently with the web page application 105 is providing to the user.

Relevance engine 115 is configured to handle request for relevant documents from help manager 110. In conjunction with such a request, relevance engine 115 can receive a set of metadata that includes one or more attribute values specified in hierarchies of attributes that are associated with a web page application 105 is providing to a user. Based on the set of metadata, relevance engine 115 identifies a set of attribute values specified in hierarchies stored in hierarchy storage 125 and determines boost values for the set of attribute values. Next, relevance engine 115 generates a query for a set of relevant documents that specifies the set of attribute values and the corresponding boost values. Relevance engine 115 then sends the query to search engine 120 for processing. In return, relevance engine 115 receives the set of relevant documents, which relevance engine 115 forwards to help manager 110.

Search engine 120 handles requests for documents stored in document storage 130. For example, search engine 120 may receive a query for a set of relevant documents that specifies a set of attribute values and boost values associated with the set of attribute values. Search engine 120 then retrieves documents stored in document storage 130 and sorts the retrieved documents based on the set of attribute values and the boost values associated with the set of attribute values. Finally, search engine 120 determines a subset of the sorted documents as a result set of documents that search engine 120 sends to relevance engine 115. In some embodiments, search engine 120 determines the subset of the sorted documents based on a defined number of documents to generate in a result set of documents. Search engine 120 may be a NoSQL-based search engine in some embodiments.

FIG. 1 illustrates help manager 110, relevance engine 115, and search engine 120 as separate elements. One of ordinary skill in the art will appreciate that the two or more of these elements may be implemented as a single element. For instance, in some embodiments, relevance engine 115 and/or search engine 120 may be included in help manager 110. Also, one of ordinary skill in the art will understand that each of help manager 110, relevance engine 115, and search engine 120 may be implemented by multiple elements. For example, relevance engine 115 may be implemented by a first element configured to identify a set of attribute values specified in hierarchies stored in hierarchy storage 125 and a second element configured to determine boost values for the set of attribute values.

An example operation will now be described by reference to FIGS. 1-5. Referring to FIG. 1, the operation starts by a user sending application 105 a request to enable a help feature for a web page that application 105 is providing the user. In this example, the web page that application 105 is providing the user is a web page configured for creating an invoice for a chair purchased and sold in the USA. Accordingly, the web page is associated (e.g., tagged) with a location attribute value of USA, which is an attribute value of a location specified in the hierarchy of locations 200, and a commodity attribute value of Chair, which is an attribute value of a commodity specified in the hierarchy of commodities 300.

In response to the request, application 105 sends help manager 110 a request to provide relevant documents along with a set of metadata that includes context information associated with the application 105. For this example, the context information associated with the application 105 is the attribute values with which the web page is associated—a location attribute value of USA and a commodity attribute value of Chair. When help manager 110 receives the request and the set of metadata, help manager 110 sends relevance engine 115 the set of metadata and a request for a set of relevant documents.

Upon receiving the request and the set of metadata, relevance engine 115 identifies a set of attribute values specified in hierarchies stored in hierarchy storage 125 based on the set of metadata. In some embodiments, relevance engine 115 identifies the set of attribute values by, for each attribute value in the set of metadata, determining the hierarchy in which the attribute value is specified and identifying ancestors and/or descendants of the attribute value in the hierarchy. For the attribute value of USA in the set of metadata, relevance engine 115 determines the hierarchy of locations 200 as the hierarchy in which the attribute value is specified (i.e., node 220) and identifies nodes 205 and 210 as ancestors of the node representing the attribute value of USA and nodes 240-260 as descendants of the node representing the attribute value of USA. For the attribute value of Chair in the set of metadata, relevance engine 115 determines the hierarchy of commodities 300 as the hierarchy in which the attribute value is specified (i.e., node 330) and identifies nodes 305, 310, and 320 as ancestors of the node representing the attribute value of Chair and nodes 340 and 345 as descendants of the node representing the attribute value of Chair.

Next, relevance engine 115 determines boost values for the set of identified attribute values. In some embodiments, relevance engine 115 determines the boost values for the set of identified attribute values by assigning priority values to each level in the hierarchies used for identifying the set of attribute values above. In some embodiments, relevance engine assigns the level in the hierarchy that specifies the attribute value in the set of metadata with the highest value and then assigns each levels above and below that level with decreasingly lower values. In this example, relevance engine 115 assigns the third level in the hierarchy of locations 200 that specifies the location attribute value of USA with a value of 5, assigns the parent level of the third level (i.e., the second level) with a value of 4, assigns the child level of the third level (i.e., the fourth level) with a value of 3, assigns the grandparent level of the third level (i.e., the first level) with a value of 2, and assigns the grandchild level of the third level (i.e., the fifth level) with a value of 1. Similarly, relevance engine 115 assigns the fourth level in the hierarchy of locations 300 that specifies the location attribute value of Chair with a value of 5, assigns the parent level of the fourth level (i.e., the third level) with a value of 4, assigns the child level of the fourth level (i.e., the fifth level) with a value of 3, assigns the grandparent level of the fourth level (i.e., the second level) with a value of 2, and assigns the great grandparent level of the fourth level (i.e., the first level) with a value of 1.

In some embodiments, relevance engine 115 may assign weights to different hierarchies of attribute values. In this example, the hierarchy of locations 200 is assigned a weight of one and the hierarchy of commodities 300 is assigned a weight of 2. Relevance engine 115 then determines the boost values for the set of identified attribute values based on the assigned priority values and weights by using the following equation:

$$q_{(ij)boost} = k + m \times \left(p_{T_{ij}} \times \frac{w_i}{w_{sum}}\right)$$

where $q_{(ij)boost}$ is a boost value, i is the hierarchy associated with the attribute value, j is the level in the hierarchy associated with the attribute value, k is base boost value, m is a boost multiplier, $pr_{ij}$ is the priority value associated with the attribute value, $w_i$ is the weight associated with the attribute value, and $w_{sum}$ is the sum of the weights. For this example, relevance engine 115 uses a base boost value k of 0 and a boost multiplier value m of 1. Using the example priority values and equation above, relevance engine 115 determines the boost value for the all locations attribute value as ⅔ (i.e., 2×(⅓)), the boost value for the North America location attribute value as 4/3 (i.e., 4×(⅓)), the boost value for the USA location attribute value as 5/3 (i.e., 5×(⅓)), the boost values for the California and Oregon location attribute values as 1 (i.e., 3×(⅓)), and the boost values for the San Francisco, Los Angeles, and Portland location attribute values as ⅓ (i.e., 1×(⅓)). Similarly, relevance engine 115 determines the boost value for the all commodities attribute value as ⅔ (i.e., 1×(⅔)), the boost value for the Hardware commodity attribute value as 4/3 (i.e., 2×(⅔)), the boost values for the Office Furniture commodity attribute value as 8/3 (i.e., 4×(⅔)), the boost value for the Chair commodity attribute value as 10/3 (i.e., 5×(⅔)), and the boost values for the Computer Chair and Non-ergonomic Chair commodity attribute values as 2 (i.e., 3×(⅔)). Once relevance engine 115 determines the boost values for the set of identified attribute values, relevance engine 115 generates a query for a set of relevant documents tagged with the set of attribute values based on the boost values determined for the set of attribute values. Relevance engine 115 sends the query to search engine 120 for processing.

When search engine 120 receives the query for a set of relevant documents, search engine 120 retrieves documents stored in document storage 130 based on the set of attribute values specified in the query. In some embodiments, search engine 120 retrieves documents that are tagged with one or more attribute values in the set of attribute values. In this example, documents 405-450 are stored in document storage 130. Based on the example attribute values identified by relevance engine 115 described above, search engine 120 retrieves documents 405, 415, and 425-450 since those documents are tagged with one or more the attribute values. Next, search engine 120 calculates relevance scores for the retrieved documents based on the boost values associated with the set of attribute values. In some embodiments, search engine 120 calculates a relevance score for a document by identifying the tags associated with document and summing the boost values associated with the identified tags. Then, search engine 120 sorts the documents from highest to lowest relevance score. From the sorted documents, search engine 120 determines a subset of the sorted documents as a result set of documents that search engine 120 sends to relevance engine 115.

FIG. 5 illustrates an example result set of documents 500 according to some embodiments. In particular, the result set of documents 500 are determined from documents 405-450 in FIG. 4 based on the example attribute values identified by relevance engine 115 and the example retrieved documents explained above. As shown in FIG. 5, the result set of documents 500 includes documents 405, 415, and 425-450 and relevance scores calculated for these documents by summing the boost values associated with the tags of the documents. In addition, document 405, 415, and 425-450 are sorted from highest to lowest relevance score. As mentioned above, in some embodiments, search engine 120 determines the subset of the sorted documents based on a defined number of documents to generate in a result set of documents. For example, the number of documents to generate in a result set of documents may be defined as ten documents. Based on such a defined number of documents and the example illustrated in FIG. 5, search engine 120 still determines documents 405, 415, and 425-450 as the number of documents that search engine 120 retrieved and sorted is less than ten documents. However, if the number of documents to generate in a result set of documents is defined as five documents, search engine determines documents 415, 425, 430, 435, and 445 as the documents in the result set of document since those documents have the highest five relevance scores among the documents search engine 120 retrieved and sorted.

When relevance engine 115 receives the result set of documents from search engine 120, relevance engine 115 forwards them to help manager 110. Upon receiving the result set of documents, help manager 110 provides them to the user concurrently with the web page that application 105 is providing to the user and with which the result set of documents are associated.

Figure 6:
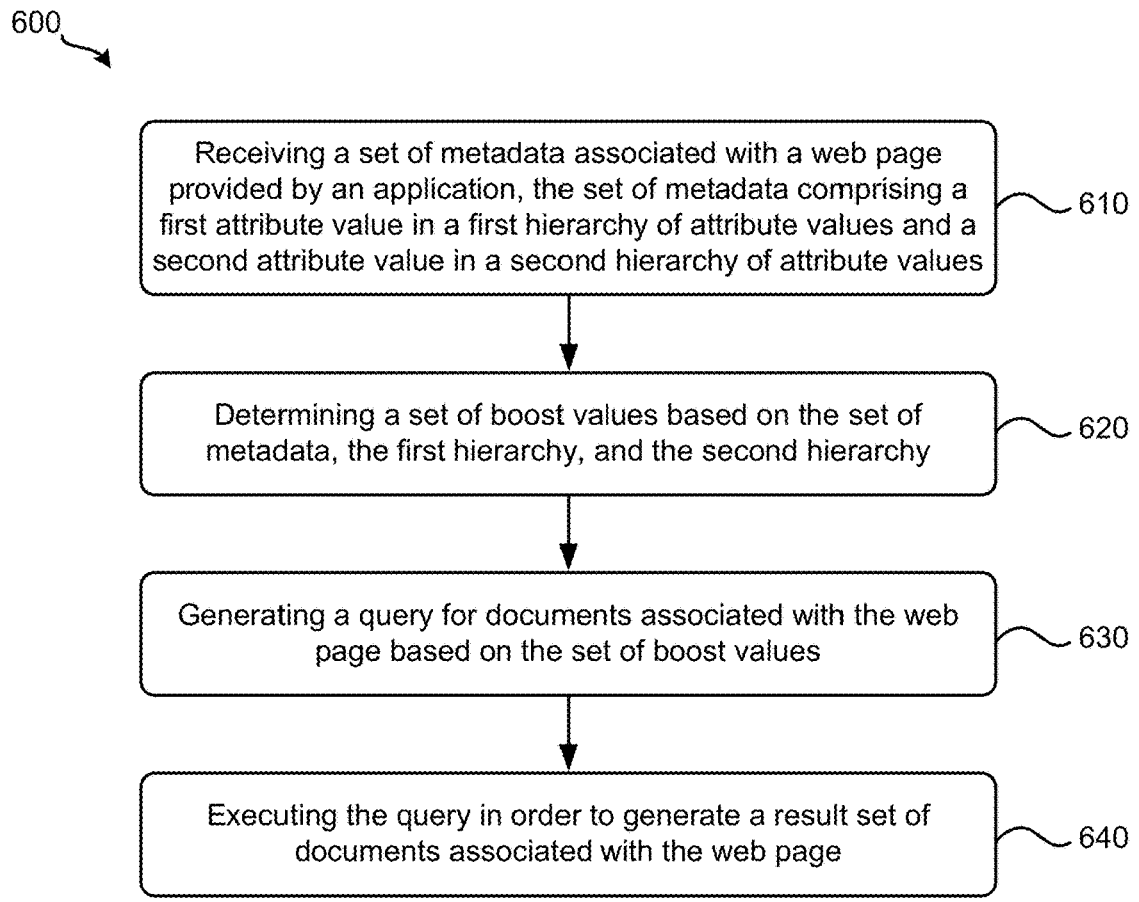
FIG. 6 illustrates a process for providing relevant documents according to some embodiments.

FIG. 6 illustrates a process 600 for providing relevant documents according to some embodiments. In some embodiments, system 100 performs process 600. Process 600 starts by receiving, at 610, a set of metadata associated with a web page provided by an application. The set of metadata includes a first attribute value in a first hierarchy of attributes and a second attribute value in a second hierarchy of attributes. Referring to the example operation describe above, help manager 110 may receive a request along with the set of metadata that includes a location attribute value of USA and a commodity attribute value of Chair. When help manager 110 receives the request and the set of metadata, help manager 110 sends relevance engine 115 the set of metadata and a request for a set of relevant documents.

Relevance engine 115 may then identify a set of attribute values specified in hierarchies stored in hierarchy storage 125 based on the set of metadata. Continuing with the example above, for the attribute value of USA in the set of metadata, relevance engine 115 determines the hierarchy of locations 200 as the hierarchy in which the attribute value is specified and identifies nodes 205 and 210 as ancestors of the node representing the attribute value of USA and nodes 240-260 as descendants of the node representing the attribute value of USA. For the attribute value of Chair in the set of metadata, relevance engine 115 determines the hierarchy of commodities 300 as the hierarchy in which the attribute value is specified and identifies nodes 305, 310, and 320 as ancestors of the node representing the attribute value of Chair and nodes 340 and 345 as descendants of the node representing the attribute value of Chair.

Next, process 600 determines, at 620, a set of boost values based on the set of metadata, the first hierarchy, and the second hierarchy. In some embodiments, process 600 may determine the set of boost values by assigning priority values to each level in the hierarchies used for identifying the set of attribute values above. Continuing with the example above, relevance engine 115 can assign the third level in the hierarchy of locations 200 that specifies the location attribute value of USA with a value of 5, assigns the parent level of the third level (i.e., the second level) with a value of 4, assigns the child level of the third level (i.e., the fourth level) with a value of 3, assigns the grandparent level of the third level (i.e., the first level) with a value of 2, and assigns the grandchild level of the third level (i.e., the fifth level) with a value of 1. Additionally, relevance engine 115 can assign the fourth level in the hierarchy of locations 300 that specifies the location attribute value of Chair with a value of 5, assigns the parent level of the fourth level (i.e., the third level) with a value of 4, assigns the child level of the fourth level (i.e., the fifth level) with a value of 3, assigns the grandparent level of the fourth level (i.e., the second level) with a value of 2, and assigns the great grandparent level of the fourth level (i.e., the first level) with a value of 1. In some embodiments, process 600 may assign weights to different hierarchies of attribute values. Continuing with the example above, relevance engine 115 may assign the hierarchy of locations 200 a weight of one and the hierarchy of commodities 300 a weight of 2. Relevance engine 115 then determines the boost values for the set of identified attribute values based on the assigned priority values and weights by using the equation described above.

Process 600 then generates, at 630, a query for documents associated with the web page based on the set of boost values. In some embodiments, the query specifies the set of identified attribute values and the boost values associated with the set of attribute values. Finally, process executes, at 640, the query in order to generate a result set of document associated with the web page. In some embodiments, process 600 executes the query by retrieving documents stored in document storage 130 based on the set of attribute values specified in the query (e.g., by retrieving documents that are tagged with one or more attribute values in the set of attribute values). Continuing with the example above, based on the example attribute values identified by relevance engine 115 described above, search engine 120 can retrieve documents 405, 415, and 425-450 since those documents are tagged with one or more the attribute values. Next, search engine 120 calculates relevance scores for the retrieved documents based on the boost values associated with the set of attribute values. In some embodiments, search engine 120 calculates a relevance score for a document by identifying the tags associated with document and summing the boost values associated with the identified tags. Then, search engine 120 sorts the documents from highest to lowest relevance score. From the sorted documents, search engine 120 determines a subset of the sorted documents as a result set of documents that search engine 120 sends to relevance engine 115. Relevance engine 115 forwards the result set of documents to help manager 110 so help manager 110 may provide them concurrently with the web page provided by application 105 with which the result set of documents are associated.

The examples and embodiments discussed above by reference to FIGS. 1-6 describe providing documents based on two hierarchies of attribute values. One of ordinary skill in the art will realize that additional and/or different hierarchies of attribute values may be used in the same or similar manner to provide documents. For instance, a hierarchy of functional attribute values that represent function(s) of web pages provided by the application may be employed. As such, documents and/or web pages may be tagged with attribute values specified in the hierarchy of functional attribute values.

Figure 7:
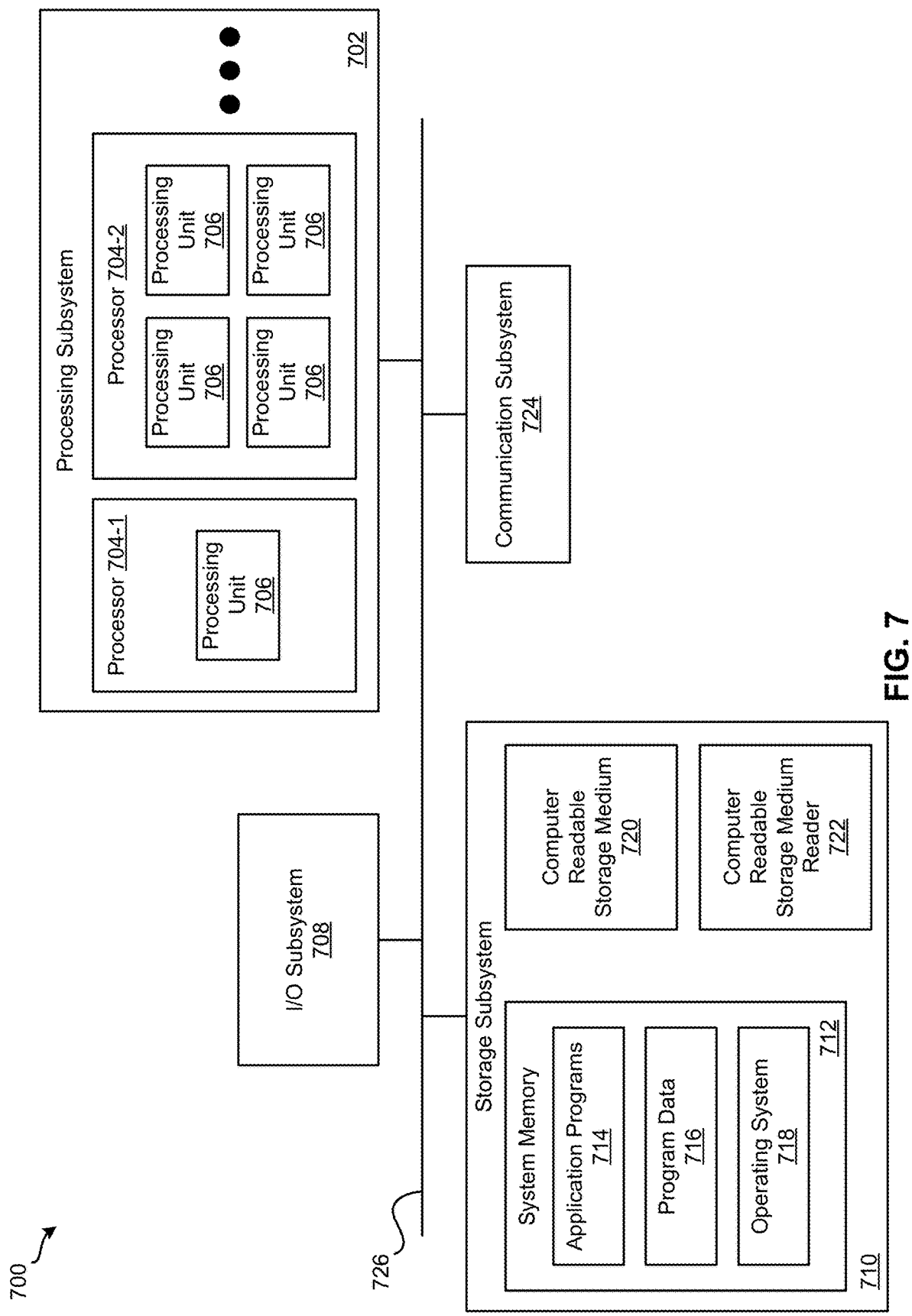
FIG. 7 illustrates an exemplary computer system, in which various embodiments may be implemented.

FIG. 7 illustrates an exemplary computer system 700 for implementing various embodiments described above. For example, computer system 700 may be used to implement system 100. Computer system 700 may be a desktop computer, a laptop, a server computer, or any other type of computer system or combination thereof. Some or all elements of application 105, help manager 110, relevance engine 115, and search engine 120, or combinations thereof can be included or implemented in computer system 700. In addition, computer system 700 can implement many of the operations, methods, and/or processes described above (e.g., process 600). As shown in FIG. 7, computer system 700 includes processing subsystem 702, which communicates, via bus subsystem 726, with input/output (I/O) subsystem 708, storage subsystem 710 and communication subsystem 724.

Bus subsystem 726 is configured to facilitate communication among the various components and subsystems of computer system 700. While bus subsystem 726 is illustrated in FIG. 7 as a single bus, one of ordinary skill in the art will understand that bus subsystem 726 may be implemented as multiple buses. Bus subsystem 726 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 702, which can be implemented as one or more integrated circuits (e.g., a conventional microprocessor or microcontroller), controls the operation of computer system 700. Processing subsystem 702 may include one or more processors 704. Each processor 704 may include one processing unit 706 (e.g., a single core processor such as processor 704-1) or several processing units 706 (e.g., a multicore processor such as processor 704-2). In some embodiments, processors 704 of processing subsystem 702 may be implemented as independent processors while, in other embodiments, processors 704 of processing subsystem 702 may be implemented as multiple processors integrate into a single chip or multiple chips. Still, in some embodiments, processors 704 of processing subsystem 702 may be implemented as a combination of independent processors and multiple processors integrated into a single chip or multiple chips.

In some embodiments, processing subsystem 702 can execute a variety of programs or processes in response to program code and can maintain multiple concurrently executing programs or processes. At any given time, some or all of the program code to be executed can reside in processing subsystem 702 and/or in storage subsystem 710. Through suitable programming, processing subsystem 702 can provide various functionalities, such as the functionalities described above by reference to process 600, etc.

I/O subsystem 708 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 700 to a user or another device (e.g., a printer).

As illustrated in FIG. 7, storage subsystem 710 includes system memory 712, computer-readable storage medium 720, and computer-readable storage medium reader 722. System memory 712 may be configured to store software in the form of program instructions that are loadable and executable by processing subsystem 702 as well as data generated during the execution of program instructions. In some embodiments, system memory 712 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 712 may include different types of memory, such as static random access memory (SRAM) and/or dynamic random access memory (DRAM). System memory 712 may include a basic input/output system (BIOS), in some embodiments, that is configured to store basic routines to facilitate transferring information between elements within computer system 700 (e.g., during start-up). Such a BIOS may be stored in ROM (e.g., a ROM chip), flash memory, or any other type of memory that may be configured to store the BIOS.

As shown in FIG. 7, system memory 712 includes application programs 714 (e.g., application 105), program data 716, and operating system (OS) 718. OS 718 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 720 may be a non-transitory computer-readable medium configured to store software (e.g., programs, code modules, data constructs, instructions, etc.). Many of the components (e.g., application 105, help manager 110, relevance engine 115, and search engine 120) and/or processes (e.g., process 600) described above may be implemented as software that when executed by a processor or processing unit (e.g., a processor or processing unit of processing subsystem 702) performs the operations of such components and/or processes. Storage subsystem 710 may also store data used for, or generated during, the execution of the software.

Storage subsystem 710 may also include computer-readable storage medium reader 722 that is configured to communicate with computer-readable storage medium 720. Together and, optionally, in combination with system memory 712, computer-readable storage medium 720 may comprehensively represent remote, local, fixed, and/or removable storage devices plus storage media for temporarily and/or more permanently containing, storing, transmitting, and retrieving computer-readable information.

Computer-readable storage medium 720 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 724 serves as an interface for receiving data from, and transmitting data to, other devices, computer systems, and networks. For example, communication subsystem 724 may allow computer system 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 724 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 724 may provide components configured for wired communication (e.g., Ethernet) in addition to or instead of components configured for wireless communication.

One of ordinary skill in the art will realize that the architecture shown in FIG. 7 is only an example architecture of computer system 700, and that computer system 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
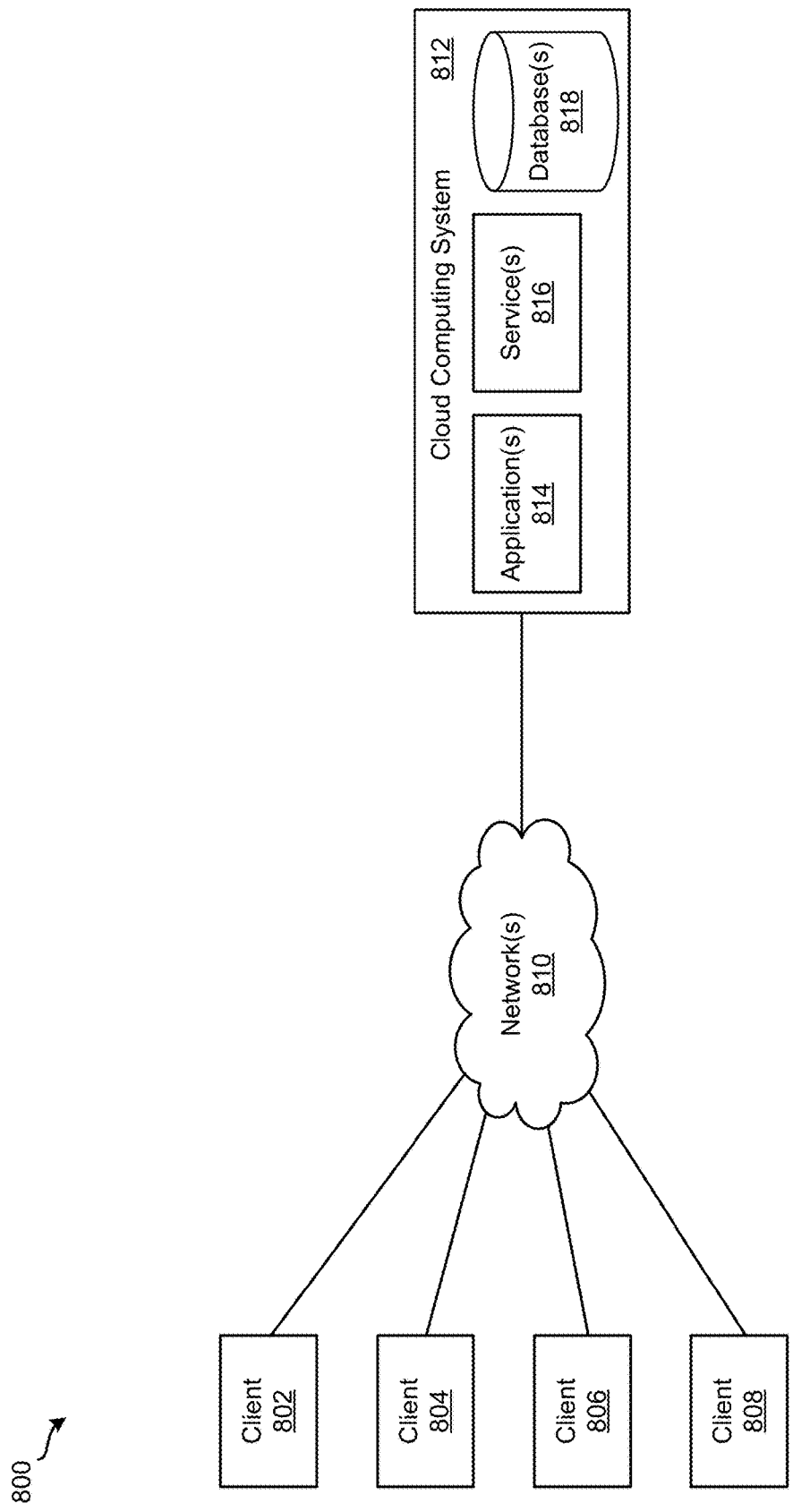
FIG. 8 illustrates system for implementing various embodiments described above.

FIG. 8 illustrates an exemplary system 800 for implementing various embodiments described above. For example, cloud computing system 812 of system 800 may be used to implement system 100. As shown, system 800 includes client devices 802-808, one or more networks 810, and cloud computing system 812. Cloud computing system 812 is configured to provide resources and data to client devices 802-808 via networks 810. In some embodiments, cloud computing system 800 provides resources to any number of different users (e.g., customers, tenants, organizations, etc.). Cloud computing system 812 may be implemented by one or more computer systems (e.g., servers), virtual machines operating on a computer system, or a combination thereof.

As shown, cloud computing system 812 includes one or more applications 814, one or more services 816, and one or more databases 818. Cloud computing system 800 may provide applications 814, services 816, and databases 818 to any number of different customers in a self-service, subscription-based, elastically scalable, reliable, highly available, and secure manner.

In some embodiments, cloud computing system 800 may be adapted to automatically provision, manage, and track a customer's subscriptions to services offered by cloud computing system 800. Cloud computing system 800 may provide cloud services via different deployment models. For example, cloud services may be provided under a public cloud model in which cloud computing system 800 is owned by an organization selling cloud services and the cloud services are made available to the general public or different industry enterprises. As another example, cloud services may be provided under a private cloud model in which cloud computing system 800 is operated solely for a single organization and may provide cloud services for one or more entities within the organization. The cloud services may also be provided under a community cloud model in which cloud computing system 800 and the cloud services provided by cloud computing system 800 are shared by several organizations in a related community. The cloud services may also be provided under a hybrid cloud model, which is a combination of two or more of the aforementioned different models.

In some instances, any one of applications 814, services 816, and databases 818 made available to client devices 802-808 via networks 810 from cloud computing system 800 is referred to as a "cloud service." Typically, servers and systems that make up cloud computing system 800 are different from the on-premises servers and systems of a customer. For example, cloud computing system 800 may host an application and a user of one of client devices 802-808 may order and use the application via networks 810.

Applications 814 may include software applications that are configured to execute on cloud computing system 812 (e.g., a computer system or a virtual machine operating on a computer system) and be accessed, controlled, managed, etc. via client devices 802-808. In some embodiments, applications 814 may include server applications and/or mid-tier applications (e.g., HTTP (hypertext transport protocol) server applications, FTP (file transfer protocol) server applications, CGI (common gateway interface) server applications, JAVA server applications, etc.). Services 816 are software components, modules, application, etc. that are configured to execute on cloud computing system 812 and provide functionalities to client devices 802-808 via networks 810. Services 816 may be web-based services or on-demand cloud services.

Databases 818 are configured to store and/or manage data that is accessed by applications 814, services 816, and/or client devices 802-808. For instance, storages 125 and 130 may be stored in databases 818. Databases 818 may reside on a non-transitory storage medium local to (and/or resident in) cloud computing system 812, in a storage-area network (SAN), on a non-transitory storage medium local located remotely from cloud computing system 812. In some embodiments, databases 818 may include relational databases that are managed by a relational database management system (RDBMS). Databases 818 may be a column-oriented databases, row-oriented databases, or a combination thereof. In some embodiments, some or all of databases 818 are in-memory databases. That is, in some such embodiments, data for databases 818 are stored and managed in memory (e.g., random access memory (RAM)).

Client devices 802-808 are configured to execute and operate a client application (e.g., a web browser, a proprietary client application, etc.) that communicates with applications 814, services 816, and/or databases 818 via networks 810. This way, client devices 802-808 may access the various functionalities provided by applications 814, services 816, and databases 818 while applications 814, services 816, and databases 818 are operating (e.g., hosted) on cloud computing system 800. Client devices 802-808 may be computer system 700, as described above by reference to FIG. 7. Although system 800 is shown with four client devices, any number of client devices may be supported.

Networks 810 may be any type of network configured to facilitate data communications among client devices 802-808 and cloud computing system 812 using any of a variety of network protocols. Networks 810 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   receiving a set of metadata associated with a web page provided by an application, the set of metadata comprising a first attribute value in a first hierarchy of attribute values for a first attribute and a second attribute value in a second hierarchy of attribute values for a second attribute;
   determining a set of boost values based on the set of metadata, the first hierarchy of attribute values for the first attribute, and the second hierarchy of attribute values for the second attribute;
   generating a query for documents associated with the web page based on the set of boost values; and
   executing the query in order to generate a result set of documents associated with the web page.

2. The non-transitory machine-readable medium of claim 1, wherein the program further comprises sets of instructions for:
   identifying a first set of attribute values based on the first hierarchy of attribute values for the first attribute; and
   identifying a second set of attribute values based on the second hierarchy of attribute values for the second attribute.

3. The non-transitory machine-readable medium of claim 2, wherein determining the set of boost values comprises:
   determining a boost value for the first attribute value;
   determining a boost value for the second attribute value;
   determining a boost value for each attribute value in the first set of attribute values; and
   determining a boost value for each attribute value in the second set of attribute values.

4. The non-transitory machine-readable medium of claim 3, wherein determining the boost values for the first attribute value and the first set of attribute values is based on a first weight value, wherein determining the boost values for the second attribute value and the second set of attribute values is based on a second weight value.

5. The non-transitory machine-readable medium of claim 3, wherein determining the set of boost values comprises:
   assigning a first set of priority values to attribute values in the first hierarchy of attribute values; and
   assigning a second set of priority values to attribute values in the second hierarchy of attribute values,
   wherein determining the boost values for the first attribute value and the first set of attribute values is based on the first set of priority values, wherein determining the boost values for the second attribute value and the second set of attribute values is based on the second set of priority values.

6. The non-transitory machine-readable medium of claim 1, wherein executing the query comprises:
   retrieving a set of documents from a plurality of documents;
   calculating a relevance score for each document in the set of documents;
   sorting the set of documents based on the relevance scores; and
   determining a defined number of documents in the set of documents having the highest relevance scores as the result set of documents associated with the web page.

7. The non-transitory machine-readable medium of claim 1, wherein the program further comprises a set of instructions for providing the result set of documents concurrently with the web page provided by the application.

8. A method comprising:
   receiving a set of metadata associated with a web page provided by an application, the set of metadata comprising a first attribute value in a first hierarchy of attribute values for a first attribute and a second attribute value in a second hierarchy of attribute values for a second attribute;
   determining a set of boost values based on the set of metadata, the first hierarchy of attribute values for the first attribute, and the second hierarchy of attribute values for the second attribute;
   generating a query for documents associated with the web page based on the set of boost values; and
   executing the query in order to generate a result set of documents associated with the web page.

9. The method of claim 8 further comprising:
   identifying a first set of attribute values based on the first hierarchy of attribute values for the first attribute; and
   identifying a second set of attribute values based on the second hierarchy of attribute values for the second attribute.

10. The method of claim 9, wherein determining the set of boost values comprises:
    determining a boost value for the first attribute value;
    determining a boost value for the second attribute value;
    determining a boost value for each attribute value in the first set of attribute values; and
    determining a boost value for each attribute value in the second set of attribute values.

11. The method of claim 10, wherein determining the boost values for the first attribute value and the first set of attribute values is based on a first weight value, wherein determining the boost values for the second attribute value and the second set of attribute values is based on a second weight value.

12. The method of claim 10, wherein determining the set of boost values comprises:
    assigning a first set of priority values to attribute values in the first hierarchy of attribute values; and
    assigning a second set of priority values to attribute values in the second hierarchy of attribute values,
    wherein determining the boost values for the first attribute value and the first set of attribute values is based on the first set of priority values, wherein determining the boost values for the second attribute value and the second set of attribute values is based on the second set of priority values.

13. The method of claim 8, wherein executing the query comprises:
    retrieving a set of documents from a plurality of documents;
    calculating a relevance score for each document in the set of documents;
    sorting the set of documents based on the relevance scores; and
    determining a defined number of documents in the set of documents having the highest relevance scores as the result set of documents associated with the web page.

14. The method of claim 8, wherein the program further comprises a set of instructions for providing the result set of documents concurrently with the web page provided by the application.

15. A system comprising:

a set of processors; and a non-transitory computer-readable medium storing instructions that when executed by at least one processor in the set of processors cause the at least one processor to:

receive a set of metadata associated with a web page provided by an application, the set of metadata comprising a first attribute value in a first hierarchy of attribute values for a first attribute and a second attribute value in a second hierarchy of attribute values for a second attribute;

determine a set of boost values based on the set of metadata, the first hierarchy of attribute values for the first attribute, and the second hierarchy of attribute values for the second attribute;

generate a query for documents associated with the web page based on the set of boost values; and execute the query in order to generate a result set of documents associated with the web page.

16. The system of claim 15, wherein the instructions further cause the at least one processor to:

identify a first set of attribute values based on the first hierarchy of attribute values for the first attribute; and identify a second set of attribute values based on the second hierarchy of attribute values for the second attribute.

17. The system of claim 16, wherein determining the set of boost values comprises:

determining a boost value for the first attribute value;

determining a boost value for the second attribute value;

determining a boost value for each attribute value in the first set of attribute values; and determining a boost value for each attribute value in the second set of attribute values.

18. The system of claim 17, wherein determining the boost values for the first attribute value and the first set of attribute values is based on a first weight value, wherein determining the boost values for the second attribute value and the second set of attribute values is based on a second weight value.

19. The system of claim 17, wherein determining the set of boost values comprises:

assigning a first set of priority values to attribute values in the first hierarchy of attribute values; and assigning a second set of priority values to attribute values in the second hierarchy of attribute values, wherein determining the boost values for the first attribute value and the first set of attribute values is based on the first set of priority values, wherein determining the boost values for the second attribute value and the second set of attribute values is based on the second set of priority values.

20. The system of claim 15, wherein executing the query comprises:

retrieving a set of documents from a plurality of documents;

calculating a relevance score for each document in the set of documents;

sorting the set of documents based on the relevance scores; and determining a defined number of documents in the set of documents having the highest relevance scores as the result set of documents associated with the web page.

* * * * *